United States Patent [19]

Taylor

[11] 3,909,559

[45] Sept. 30, 1975

[54] ELECTRONIC HYBRID

[75] Inventor: Michael Geoffrey Cleeve Taylor, Maidstone, England

[73] Assignee: GTE International Incorporated, Stamford, Conn.

[22] Filed: Apr. 19, 1974

[21] Appl. No.: 462,469

[30] Foreign Application Priority Data

July 3, 1973 United Kingdom............... 31712/73

[52] U.S. Cl.......................... 179/170 NC; 179/1 CN

[51] Int. Cl.$^2$....................... H04B 1/58; H04M 3/56

[58] Field of Search .................. 179/170 R, 170 NC

[56] References Cited

UNITED STATES PATENTS

| | | | |
|---|---|---|---|
| 3,060,265 | 10/1962 | Duncan et al. | 179/1 CN |
| 3,180,947 | 4/1965 | Haselton, Jr. et al. | 179/170 NC |
| 3,480,742 | 11/1969 | Gaunt, Jr. | 179/170 NC |
| 3,530,260 | 9/1970 | Gaunt, Jr. | 179/170 NC |
| 3,700,831 | 10/1972 | Aagaard et al. | 179/170 NC |

FOREIGN PATENTS OR APPLICATIONS

| | | | |
|---|---|---|---|
| 1,124,351 | 8/1968 | United Kingdom | 179/170 NC |

OTHER PUBLICATIONS

D. Esteban and C. Jacquart, "Two-Way/Four-Way Circuit," IBM Technical Disclosure, Vol. 16, No. 5, October 1973, pp. 1556–1557.

*Primary Examiner*—Kathleen H. Claffy
*Assistant Examiner*—Randall P. Myers

[57] ABSTRACT

An electronic hybrid circuit is provided for connecting a signal transmitting circuit and a signal receiving circuit to a both-way signal transmission circuit, said circuit comprising a constant current supply source providing current supply terminals for connection to said both-way signal transmission circuits, a transistor, the current path of which is connected across said current supply terminals in series with a line balance load impedance, and a signal summation circuit having inputs connected respectively at opposite sides of the current path of said transistor. The arrangement being such that with a signal receiving circuit connected to provide a control signal to a current control electrode of said transistor, and a signal transmitting circuit connected to receive an output from said signal summation circuit, signal voltages generated across the impedance presented to said supply terminals in response to receipt of signals by said both-way transmission circuit or transmission of signals from said signal receiving circuit are fed to said signal transmitting circuit via said signal summation circuit, the signal voltages generated by said signal receiving circuit being at least partially cancelled in the summation circuit by corresponding signal voltages generated in phase opposition across said line balance load impedance.

6 Claims, 4 Drawing Figures

ELECTRONIC HYBRID

BACKGROUND OF THE INVENTION

This invention relates to an electronic hybrid circuit element for use in coupling separate "transmit" and "receive" facilities to a common "both-way" signal facility.

OBJECTS AND SUMMARY OF THE INVENTION

The hybrid circuit element of the invention accordingly provides unbalanced signal transmit, signal receive and both-way line signal ports and includes a line balance impedance which is arranged to at least partially balance the impedance real or apparent, seen from the both-way line signal port. Also, the circuit arrangement is such that the hybrid element presents an impedance to the both-way signal transmission facility with which it is used, which is high relative to said line balance impedance. Thus, one or more of the hybrid circuit elements may have their both-way line signal ports connected to a both-way signal transmission facility without materially degrading the transmission properties of that facility. Again, providing steps are taken to ensure that a requisite impedance is presented to the both-way signal port, and to which the balance impedance included within the hybrid circuit element corresponds or is related, the hybrid circuit element may form part of the transmission circuit of a telephone instrument or a number of hybrid circuit elements may be arranged to permit a corresponding number of signal transmit and signal receive facilities to be coupled to one another as for a conference type connection or circuit.

With the above arrangement, since the signals applied to the both-way line signal port by the hybrid element are derived from a constant current source, the impedance which the hybrid element presents to the both-way transmission facility with which it is used, is high relative to the reference or characteristic impedance of that facility. The both-way transmission facility may be constituted by any physical transmission path over which signals pass in opposite directions and may be constituted by a long transmission line, a short transmission line or simply a common point. Thus, providing the both-way transmission facility employed is suitably terminated by a reference or characteristic impedance or impedances, a number of hybrid elements may be connected or coupled thereto, without introducing any material distortion of the line impedance at the point of connection so that, when used for conference type connections at distributed points along a long transmission line, for example, signal reflection and echo effects are substantially avoided. In order to compensate for the relatively low efficiency of the coupling provided by the hybrid element, owing to the impedance presented to the both-way transmission circuit, signal transmitting and receiving circuits to be associated with said element advantageously include signal amplifiers. Also, the amplifiers included in the transmit and receive signal current paths may be provided with means to adjust their gain characteristics so that the response characteristics of the particular transmit and receive facilities with which the element is used, and which may be constituted by the microphone and receiver of a telephone instrument, or the transmit and receive paths of a four wire communication line, or circuit, are enhanced.

Other objects will appear from time to time in the ensuing specifications, drawings, and claims.

DESCRIPTION OF THE PREFERRED EMBODIMENT

Figure 1:
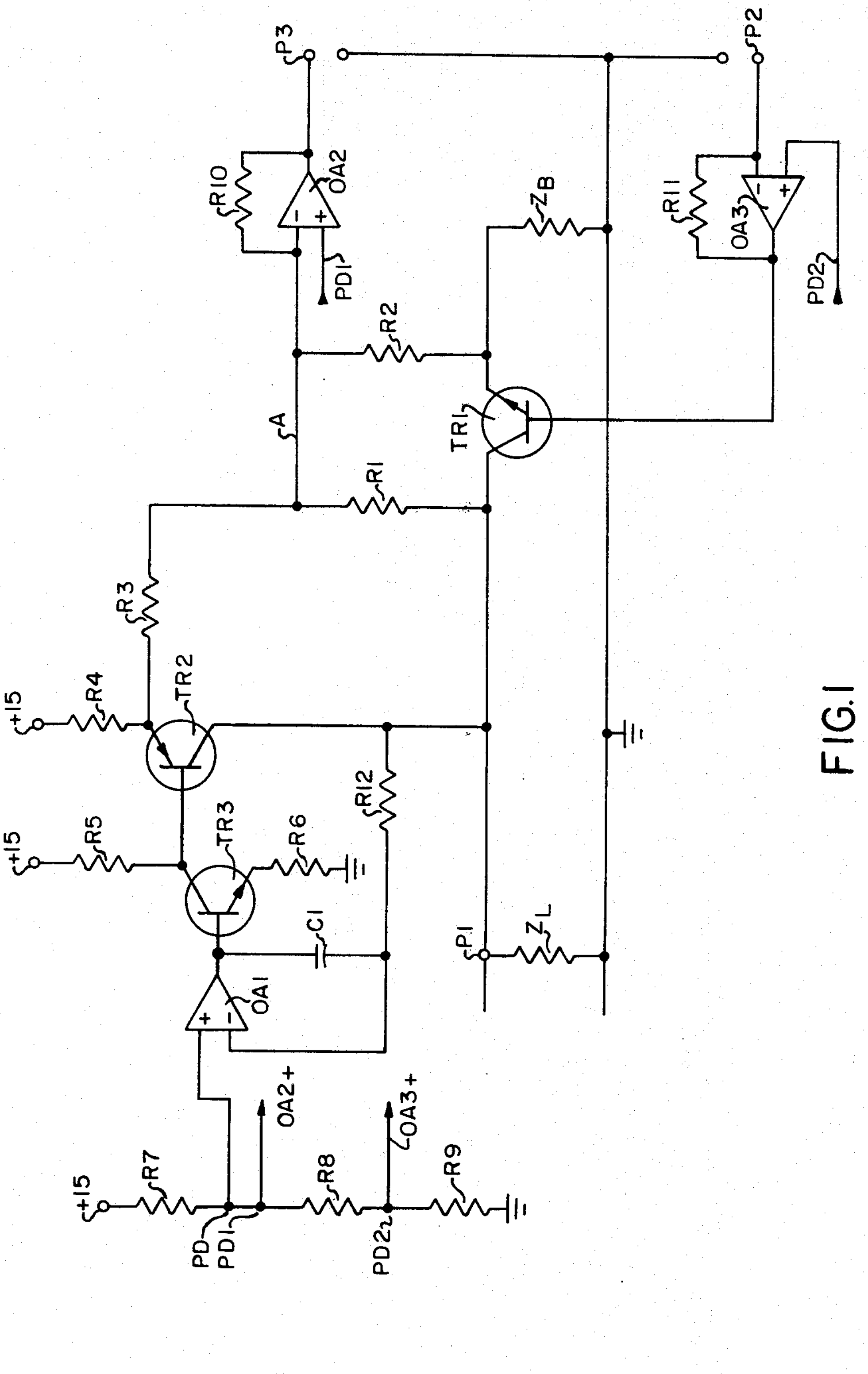
FIG. 1 is a schematic circuit diagram showing one embodiment of a signal hybrid circuit element according to the invention.

Referring to FIG. 1, the hybrid circuit element there shown provides a both-way line signal port P1, a receive or incoming port P2 and a transmit or outgoing port P3 and comprises a signal control transistor TR1 and a constant current supply source, which includes the differential amplifier OA1, and associated current control transistors TR2 and TR3. The transistor TR1 has its collector and emitter electrodes connected over respective signal tapping resistors R1 and R2 to a signal summation point A, the collector electrode also being connected to the port P1 and to the collector electrode of the constant current supply transistor TR2 and the emitter electrode of transistor TR1 also being connected to earth over a line balance impedance ZB. The base electrode of transistor TR1 is connected, from the output of a receive differential amplifier OA3, to whose − input the receive port P2 is connected, while the summation point A is connected to the − input to a transmit differential amplifier OA2 from whose output the transmit port P3 is connected. The amplifiers OA1, OA2 and OA3 have their + inputs connected to appropriate bias potentials derived from a potential divider PD formed by the chain of resistors R7, R8 and R9, of which the resistors R7 and R9 have their free ends connected respectively to a positive supply source (+ 15V) and to earth. The impedance ZL shown in dotted line and connected between the port P1 and earth, represents the impedance, real or apparent, which in use of the element, is seen from the port P1. As described in more detail below, it is essential that the impedance ZL shall have a specified reference value to which the balance impedance ZB is related. For the constant current supply element, the potential existing at the junction of the collector electrodes of transistors TR1 and TR2 is applied over a low pass filter, formed by the resistor R12 and capacitor C1 to the − input to the differential amplifier OA1. The + input to this amplifier is connected to the bias point PD on the potential divider PD, so as to provide a datum bias of approximately half the supply potential, i.e., approximately 7.5 Volts for the arrangement shown. The amplifier OA1 operates via transistor TR3 to control the current passed by transistor TR2 so as to maintain the steady state potential at the junction of the collector electrodes of transistors TR1 and TR2 approximately equal to the bias potential derived from the potential divider PD. The collector and emitter electrodes of transistor TR3 are biased from the +15V supply over the respective collector and emitter load resistors R5 and R6. The emitter of transistor TR2 is biased by the emitter load resistor R4, the bias potential at the emitter of transistor TR2 also being applied over resistor R3 to the summation point A, so that in conjunction with the steady state potentials applied to the summation point A over the signal tapping resistors R1 and R2, the summation point A and hence the − input to the differential amplifier OA2 is caused to have a steady state bias of approximately 7.5 Volts. The + input to the amplifier OA2 is correspondingly biased from the point PD1 on the potential divider PD. Thus, in the absence of any signal input, the amplifier OA2 has substantially zero output. For the receive amplifier OA3, the + input is biased to approximately + 3V from the bias point PD2 on the potential divider PD so that under steady state conditions an output is applied to the base electrode of transistor TR1 to enable this transistor to pass the current fed to it from the constant current source transistor TR2.

In operation of the element, the application of a varying signal voltage to the receive port P2 results in corresponding variations in the drive applied to the transistor TR1 from the output from amplifier OA3, and, consequently, in corresponding variations in the current drawn by the transistor TR1 from the constant current source. These current variations cause corresponding signal voltage variations to be developed over the balance impedance ZB. Also, due to the variations in the current drawn by the transistor TR1, complementary current variations are applied from the constant current source, over the port P1 and the line impedance ZL. The current variations thus set up in the line and balance impedances result in the development of line and balance signal voltages which are in phase opposition to one another and these are applied over the respective collector and emitter signal tapping impedances R1 and R2 to the signal summing point A, at which point, the signal voltages wholly or partially cancel one another, depending upon the relative values of the impedances ZL, ZB, R1 and R2. Thus, if the impedance ZL has a value Zo/2, where Zo is the characteristic impedance of a two wire line to which the port P1 is connected, then the balance impedance may have a value Zo K/2, where K is any constant. By choosing the signal tapping resistors R1 and R2, so that the resistor R2 has a value KR1, then a substantially complete cancellation of the signal voltages is effected at the summation point A and substantially no signal voltage is applied to the transmit port P3 due to the application of a signal voltage at the receive port. The receive and transmit amplifiers OA3 and OA2, may be provided with feed-back impedances, represented in FIG. 1 by the resistors R10 and R11, respectively, and by means of which the gain characteristics of these amplifiers may be tailored to enhance the response characteristics of the transmit and receive facilities with which the element is used. Also, due to the use of a constant current supply source, the element itself presents a high signal impedance to the line connected to the port P1. Thus, in a particular arrangement in which the impedance ZB and the resistor R4 are each of the order of 300Ω while the resistors R1, R2 and R3 are each of the order of 47KΩ, the signal impedance presented at the port P1 by the element is of the order of 15K ohms. While the proposed hybrid circuit element is unbalanced with respect to the transmission of signals over the ports P1, P2 and P3, the signals at any one or more of these ports can be transformed to the balanced form in known manner, as required.

Figure 2:
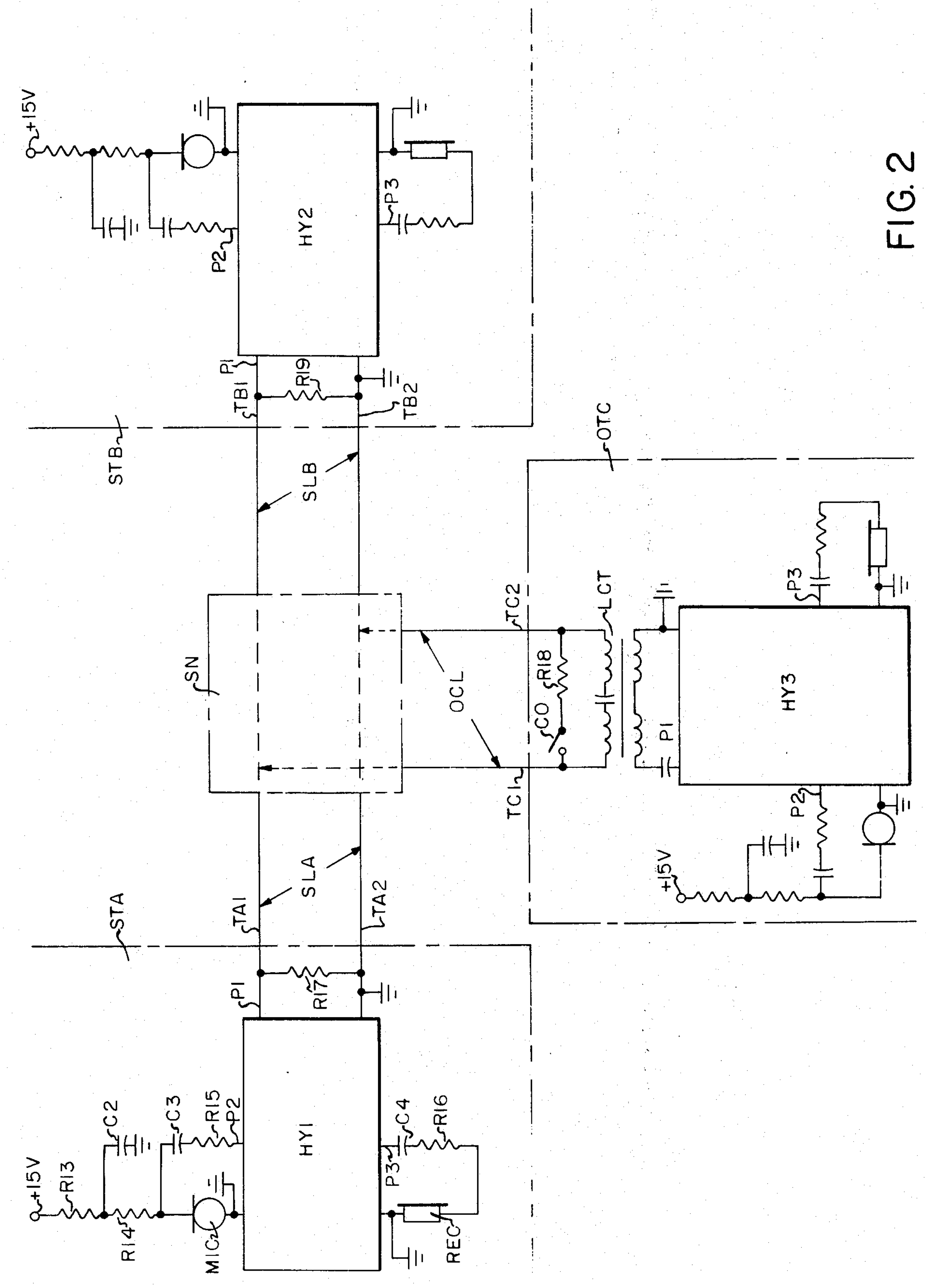
FIGS. 2–4 are explanatory diagrams illustrating various applications of the proposed hybrid circuit element.

Turning now to FIG. 2 of the attached drawings, this shows how a hybrid circuit element according to the invention may be adapted for use in the signal transmission circuit of a subscriber telephone instrument or for use in conjunction with an operator's telephone set, and illustrates applications of the telephone instrument circuits so formed, in which two subscriber telephone instrument circuits, shown within the dotted rectangles STA and STB are connected together for communication over the both-way telephone lines SLA and SLB, shown as being interconnected by a central switching network SN to form a through transmission path, and in which an operator's telephone set indicated within the dotted rectangle OTC may be connected over connecting wires OCL to one or other of the lines SLA or SLB for communication with the respective subscriber telephones STA or STB, or tapped across the through communication path formed by the lines SLA and SLB for simultaneous communication with both the telephone instruments STA and STB.

The subscriber telephone instrument circuits shown at STA and STB are identical, while the operator's telephone circuit differs from these in specific detail, which will be described later, below. Within each telephone circuit, the block designated HY1 for circuit STA, HY2 for circuit STB and HY3 for circuit OTC, represents a hybrid circuit element as described above with reference to FIG. 1, and each provides a both-way line signal port P1, a receive or incoming port P2 and a transmit or outgoing port P3. For the telephone instrument circuit STA, the line wires SLA are connected over the telephone instrument line terminals TA1 and TA2, one line wire being connected to the port P1 and the other line wire being connected to the hybrid circuit earth point within the telephone instrument a resistor R17 is bridged across the line terminals TA1 and TA2. Similarly, the telephone circuit STB includes a resistor R19 bridged across the telephone line terminals TB1 and TB2. The resistors R17 and R19 are each chosen to have a value of resistance substantially equal to the characteristic impedance of a telephone line wire pair, nominally 600Ω. Thus, when the line wires SLA and SLB are connected together via the switching network SN, the through transmission path formed constitutes a two wire line terminated at each end in its characteristic impedance Zo, so that the transmission path is substantially free of unwanted signal reflection and echo effects. Also the impedance to signal currents seen from the both-way line ports P1 of the hybrids HY1 and HY2, is substantially equal to Zo/2 which constitutes the reference impedance value, in conjunction with which the value of the hybrid balance impedance ZB (FIG. 1) is chosen, as previously described. The microphone MIC of the telephone circuit STA has one terminal connected to the hybrid circuit earth point and its other terminal connected to a + 15V supply over a load resistor R14 and a current limiting resistor R13. The junction of resistors R13 and R14 is decoupled to earth by capacitor C2, while the transmitter output signal, developed over load resistor R14, is connected to the receive port P2 over a high pass filter constituted by the series connected capacitor C3 and resistor R15. The receiver of the telephone instrument STA also has its one terminal connected to the hybrid circuit earth point, its other terminal being connected to the hybrid transmit port P3 over a high pass filter constituted by the series connected capacitor C4 and resistor R16. Referring again to FIG. 1, for the telephone circuit application now being described, the feed-back impedances R10 and R11 associated with the transmit and receive amplifiers OA2 and OA3 would preferably be constituted by low pass filter elements comprising parallel connected resistor and capacitor elements the high pass amplifier input filter, described above together with low pass feed-back filter being designed to define the frequency response of the respective amplifier so as to enhance the frequency response characteristic of the telephone instrument microphone and receiver.

The operator's telephone circuit shown within the rectangle OTC, FIG. 2, includes the hybrid circuit element HY3 and is shown with a telephone microphone and receiver coupled to the hybrid receive and transmit ports P2 and P3 in the same manner as described above for the subscriber instrument circuit STA. In this case, however, the operator connecting line wires OCL are coupled to the both-way line port P1 over line wire terminals TC1 and TC2 and a line coupling transformer LCT, which provides for unbalanced to balanced signal transmission while the line terminating resistor R18, in series with a "make" contact CO bridges the line terminals. The contact CO may be operated manually, or automatically, it being arranged that when the operator's circuit is connected to one or other of the subscriber lines SLA or SLB, the contact CO is operated to terminate the line OCL in the characteristic impedance Zo, so that the impedance seen from the ports P1 of the hybrids HY3 and HY1 or HY2 will be Zo/2, so that the operator enjoys the same transmission efficiency as do the subscribers. However, in the case where the operator's telephone circuit is tapped across an existing two wire connection between two subscriber's telephone instruments such as STA and STB, then the contact CO in the operator's telephone circuit is not operated so that the line terminating resistor R18 remains disconnected from the line terminals TC1 and TC2. It will be appreciated that, in this case, since the existing two wire transmission path between the subscriber telephone circuits is already terminated at each end in its characteristic impedance Zo, by the line terminating resistors R17 and R19 the impedance seen from the both-way line signal ports P1 of each of the hybrids HY1, HY2 and HY3, is Zo/2. Also, since the operator hybrid HY3 presents a high impedance relative to the impedance Zo, its presence does not materially effect the transmission properties of the two wire connection. Thus, the operator's telephone set appears as a high impedance tap onto the existing two wire connection, while the operator enjoys the full telephone transmission efficiency and improved fidelity of reproduction enjoyed by the subscriber telephone instruments in the absence of the operator tap.

In the case of telephone instruments connected over two wire lines such as SLA or SLB to a telephone exchange, D.C. power is normally supplied over the telephone line wires from the exchange, for signaling purposes and it is contemplated that means may be provided to derive the constant current supply for the hybrid elements in FIG. 2 from the associated two wire line, thus rendering a separate power supply and the current regulating transistors TR2 and TR3 and the amplifier OA1, FIG. 1, unnecessary.

Figure 3:
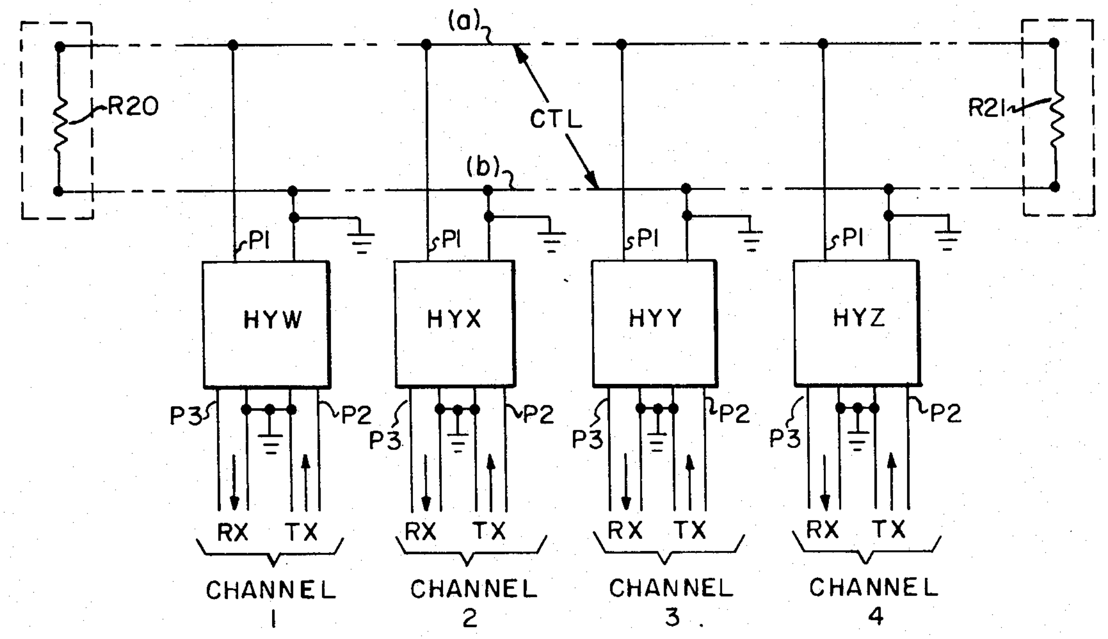
Figure 4:
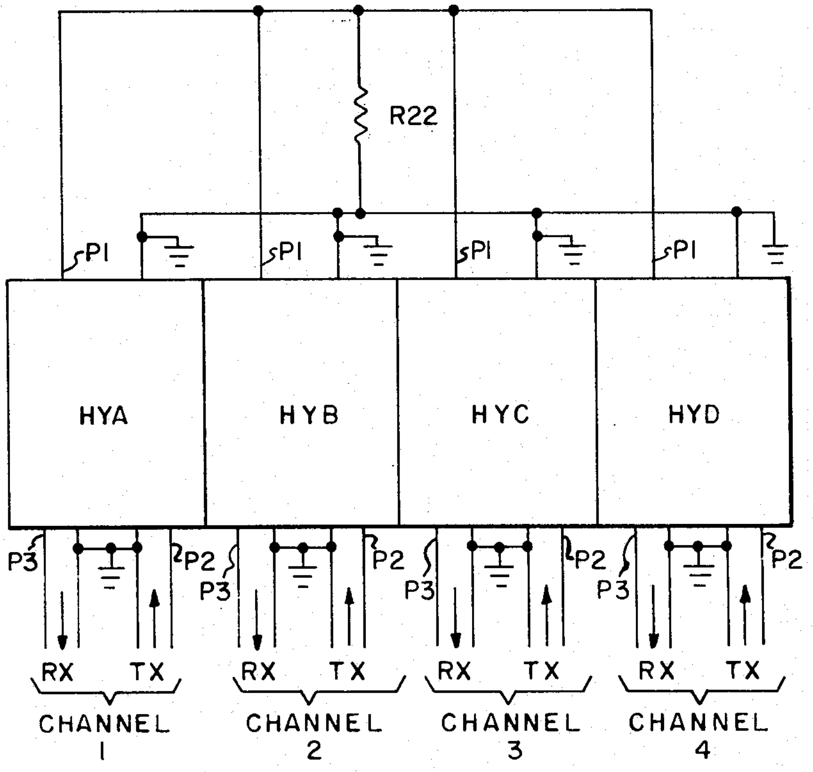

Turning now to FIGS. 3 and 4 of the attached diagrams, these show, in principle, how the hybrid circuit element of FIG. 1, may be used for conference system or circuit applications. A conference system or circuit is one in which a number of parties may hold a telephone conversation with one another and the transmission condition must be such that each party to the conference can hear all or any other party. This implies that each party must contribute his speech at a level all can hear, but without his speech being reproduced in his own receiver at an uncomfortable high level. Also, the "noise" in the system due to signal reflections and echo effects resulting from mismatching at the points of access to the conference system or circuit must be less than the speech volume of any one party. These conditions can be met by providing each party to a conference with a hybrid circuit element as described above with reference to FIG. 1 of the drawings providing steps are taken to ensure that the impedance seen from the both-way line signal port of each hybrid has a reference value to which the hybrid balance impedance is related.

FIG. 3 illustrates, in principle, a trunk connected conference system which comprises a both-way transmission line CTL which is terminated at each end in its characteristic impedance Zo by resistors R20 and R21, respectively. A number of hybrid circuit elements of the invention are distributed along the line. FIG. 3 only four hybrid circuit elements, designated HYW, HYX, HYY and HYZ are indicated, but it will be appreciated that more or less may be provided as required. The both-way transmission line CTL comprises line wires (a) and (b) and each of the hybrid elements has its both-way line signal port P1 connected to the (a) line wire and its earth point connected to the (b) line wire. Since the transmission line CTL is terminated at each end in its characteristic impedance Zo, signal reflections from these terminations are minimal. Also the impedance seen from the both-way line signal port of each hybrid element is Zo/2, to which the balance impedance ZB (FIG. 1) corresponds. The hybrid elements are each shown with their receive and transmit ports P2 and P3 connected respectively to the receive and transmit paths Tx and Rx of a respective one of the four wire transmission channels 1–4, to which receive and transmit facilities, for example loud speaking telephone sets may be connected. In each hybrid element the receive and transmit amplifiers OA2 and OA3 (FIG. 1) may have any desired level of gain by suitable choice, or adjustment, of the feed-back resistors R10 and R11, and since each hybrid element produces minimal side tone, the signal applied to the receive port of any one of the hybrid elements will comprise the sum of the signals from all other parties to the conference, which is a main requirement for a conference system, as outlined above. Again since each hybrid element presents an impedance to the both-way transmission line CTL which is high relative to the characteristic impedance Zo of the line, the presence of the hybrid circuit element without unduly impairing the transmission properties of the line, hence the signal reflection and echo effects which occur at each hybrid connection point are also minimal. The trunk connected conference system described may of course take many alternative forms. For example, each of the hybrid circuit elements could be replaced by an operator's telephone circuit OTC (FIG. 2), the contact "CO" being retained in its unoperated condition so that no line termination is applied from these circuits, while the transmission line terminal resistors R20 and R21 could be provided by the line terminating impedances of additional telephone instruments, in which the contact CO is retained in its operated position to connect the line terminating resistors across the line wires as previously described with reference to FIG. 2. The telephone instrument circuits could have switched access to the transmission line, for example as in a trunk connected intercommunication system, the arrangement permitting any party to join or leave a conference without materially affecting the transmission characteristics or stability of the remainder of the system.

FIG. 4 illustrates in principle how a number of hybrid elements according to the invention may be interconnected with a single reference impedance R22, to form a compact conference circuit. For this application the impedance R22 has a value chosen with reference to the line balance impedance included in each hybrid element. One end of the impedance R22 is connected to the line signal port P1, while the other end is connected to the earth point of each hybrid circuit element included in the conference circuit. As in FIG. 3, only four hybrid circuit elements, designated HYA, HYB, HYC and HYD are shown, but more or less than four may be provided, as required and, as previously described, due to the high impedance which each hybrid element presents across the impedance R22, the reference value of this impedance is not materially impaired. The receive and transmit ports P2 and P3 of each hybrid element are shown connected to the receive and transmit paths Tx and Rx of a respective one of the four wire transmission channels 1–4 and these may each be coupled to respective two wire access points, by means of additional hybrid elements, not shown, connected in known manner to provide for four wire to two wire conversion.

Whereas the preferred form of the invention has been shown and described herein, it should be realized that there may be many substitutions, alterations and modifications thereto without departing from the teachings of this invention.

What I claim is:

1. An electronic hybrid circuit for connecting a signal transmitting circuit and a signal receiving circuit to a two-way signal transmission circuit, said circuit comprising:

constant current supply source means for providing current supply terminals for connection to said two-way signal transmission circuit;

a signal control transistor, a line balance load impedance connected in series with the current path of said signal control transistor, said current supply terminals connected across the series combination of said signal control transistor current path and said balance impedance; and a signal summation circuit having inputs connected respectively at opposite sides of the current path of said signal control transistor, said signal summation circuit includes a series impedance element in each of said inputs connected respectively at opposite sides of the current path of said signal control transistor and wherein said signal transmitting output of said summation circuit is formed by the junction of said two series impedance elements, the arrangement being such that with a signal receiving circuit connected to provide a control signal to a current control electrode of said transistor, and a signal transmitting circuit connected to receive an output from said signal summation circuit, signal voltages generated across the impedance presented to said supply terminals in response to receipt of signals by said two-way transmission circuit or transmission of signals from said signal receiving circuit are fed to said signal transmitting circuit via said signal summation circuit, the signal voltages generated by said signal receiving circuit being at least partially cancelled in the summation circuit by corresponding signal voltages generated in phase opposition across said line balance load impedance.

2. A circuit as claimed in claim 1, wherein said signal receiving circuit is connected to provide a control signal to a current control electrode of said signal control transistor, and a signal transmitting circuit is connected to receive an output from said signal summation circuit, said signal receiving and transmitting circuits each including a signal amplifier.

3. A circuit as claimed in claim 2, wherein said signal amplifiers include means to adjust their gain characteristics.

4. A circuit as claimed in claim 1, wherein the current path of said signal control transistor is formed by a collector and an emitter electrode of said signal control transistor.

5. A circuit as claimed in claim 4, wherein the current control electrode is a base electrode of said signal control transistor.

6. A circuit as claimed in claim 1, wherein a plurality of said hybrid circuits are interconnected by means of a first terminal of a two-way line pair being connected to each of the other first terminals of said hybrid circuits and a suitable impedance network being connected between said common interconnection point and a reference point common to the second terminals of said line pairs of said two-way line signal transmission path.

* * * * *

UNITED STATES PATENT OFFICE
CERTIFICATE OF CORRECTION

PATENT NO. : 3,909,559
DATED : September 30, 1975
INVENTOR(S) : TAYLOR, Michael, G.C.

It is certified that error appears in the above-identified patent and that said Letters Patent are hereby corrected as shown below:

Column 8, line 27, delete "a" should be -- said --

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*